United States Patent
Sheng et al.

(10) Patent No.: US 9,832,499 B2
(45) Date of Patent: Nov. 28, 2017

(54) CABLE TV NETWORK BROADBAND ACCESS SYSTEM WITH DISTRIBUTED DEPLOYMENT AND CENTRALIZED CONTROL

(71) Applicants: SHENZHEN TOPWAY VIDEO COMMUNICATION CO., LTD., Shenzhen (CN); ACADEMY OF BROADCASTING PLANNING, SARFT, Beijing (CN); TOPVISION TECHNOLOGIES CO., LTD., Beijing (CN); HUAWEI TECHNOLOGIES CO. LTD., Shenzhen (CN); ZTE CORPORATION, Shenzhen (CN); CISCO SYSTEM, INC., San Jose, CA (US)

(72) Inventors: Zhifan Sheng, Beijing (CN); Jiangshan Xu, Shenzhen (CN); Yanlong Qin, Beijing (CN); Yanming Ren, Beijing (CN); Shijie Ouyang, Shenzhen (CN); Lili Sun, Beijing (CN); Biduo Chen, Shenzhen (CN); Guangsheng Wu, Shenzhen (CN); John Chapman, San Jose, CA (US); Zhenwei Li, Beijing (CN)

(73) Assignees: SHENZHEN TOPWAY VIDEO COMMUNICATION CO., LTD., Shenzhen (CN); ACADEMY OF BROADCASTING PLANNING, SARFT, Beijing (CN); TOPVISION TECHNOLOGIES CO., LTD., Beijing (CN); HUAWEI TECHNOLOGIES CO., LTD., Shenzhen (CN); ZTE CORPORATION, Shenzhen (CN); CISCO SYSTEMS INC., San Jose, CA (US)

( * ) Notice: Subject to any disclaimer, the term of this patent is extended or adjusted under 35 U.S.C. 154(b) by 21 days.

(21) Appl. No.: 14/384,496

(22) PCT Filed: Mar. 12, 2013

(86) PCT No.: PCT/CN2013/072434
§ 371 (c)(1),
(2) Date: Sep. 11, 2014

(87) PCT Pub. No.: WO2013/135156
PCT Pub. Date: Sep. 19, 2013

(65) Prior Publication Data
US 2015/0046966 A1    Feb. 12, 2015

(30) Foreign Application Priority Data
Mar. 12, 2012    (CN) .......................... 2012 1 0063644

(51) Int. Cl.
*H04N 7/173*    (2011.01)
*H04N 21/25*    (2011.01)
(Continued)

(52) U.S. Cl.
CPC ........... *H04N 21/25* (2013.01); *H04L 41/509* (2013.01); *H04L 41/5012* (2013.01);
(Continued)

(58) Field of Classification Search
CPC .. H04N 21/25; H04N 21/221; H04N 21/6118; H04N 21/238
(Continued)

(56) References Cited

U.S. PATENT DOCUMENTS 6,604,136 B1 *   8/2003   Chang ........................ G06F 9/54
                                                            709/223
6,990,121 B1 *   1/2006   Stiles .................... H04J 3/1617
                                                            370/400
(Continued)

FOREIGN PATENT DOCUMENTS

CN    102195838         9/2011
CN    102195838 A       9/2011
(Continued)

OTHER PUBLICATIONS

"Configurable, adj." OED Online. Oxford University Press, Mar. 2016. Web. Mar. 31, 2016. <http://www.oed.com/view/Entry/272091?redirectedFrom=configurable#eid>.*
(Continued)

*Primary Examiner* — Michael B Pierorazio
(74) *Attorney, Agent, or Firm* — Troutman Sanders LLP (57) ABSTRACT

The present invention provides a cable TV broadband access system with distributed deployment and centralized control,
(Continued)

which comprises: a system terminal end, configured to receive and transmit uplink and downlink service data, and receive and respond to access control data and management control data; a system access end, configured to implement data format transformation and data forwarding or processing for said uplink and downlink service data, said access control data and said management control data of said system terminal end, and transmit, receive and respond to management control data of said system access end; a system head end, configured to implement management control and access control for said system access end and said system terminal end, and process, converge and forward said uplink and downlink service data. Said system uses a system architecture with three-stage distributed deployment and centralized control comprising a system terminal end, a system access end and a system head end, and it can not only realize the end-to-end control management and QoS priority assurance of the broadband data service, but can also realize easy network deployment, low comprehensive cost and high management efficiency.

21 Claims, 4 Drawing Sheets

(51) Int. Cl.
   H04L 12/24      (2006.01)
   H04N 21/238     (2011.01)
   H04N 21/61      (2011.01)
   H04L 12/741     (2013.01)
   H04L 29/06      (2006.01)
   H04N 21/222     (2011.01)
   H04L 12/26      (2006.01)

(52) U.S. Cl.
   CPC .......... H04L 41/5022 (2013.01); H04L 45/74 (2013.01); H04L 69/22 (2013.01); H04N 21/2221 (2013.01); H04N 21/238 (2013.01); H04N 21/6118 (2013.01); H04L 41/0803 (2013.01); H04L 43/0817 (2013.01)

(58) Field of Classification Search
   USPC .......................................... 725/116; 709/224
   See application file for complete search history.

(56) References Cited

U.S. PATENT DOCUMENTS

| | | | | |
|---|---|---|---|---|
| 7,168,086 | B1* | 1/2007 | Carpenter | H04L 69/08 348/E7.073 |
| 7,447,203 | B2* | 11/2008 | Chen | H04L 12/46 370/389 |
| 7,646,732 | B2* | 1/2010 | Ould-Brahim | H04L 43/0811 370/255 |
| 7,746,796 | B2* | 6/2010 | Swallow | H04L 43/50 370/249 |
| 7,860,023 | B2* | 12/2010 | Wang | H04L 41/0213 370/252 |
| 8,199,670 | B2* | 6/2012 | Mishra | H04L 29/06027 370/254 |
| 8,718,057 | B1* | 5/2014 | Rabie | H04L 12/2852 370/390 |
| 8,732,854 | B2* | 5/2014 | Cholas | H04L 63/062 705/51 |
| 2002/0018475 | A1* | 2/2002 | Ofek | H04L 12/6418 370/400 |
| 2002/0080828 | A1* | 6/2002 | Ofek | H04L 12/6418 370/539 |
| 2002/0080829 | A1* | 6/2002 | Ofek | H04L 12/6418 370/539 |
| 2003/0061338 | A1* | 3/2003 | Stelliga | G06F 9/54 709/224 |
| 2003/0123448 | A1* | 7/2003 | Chang | G06F 9/54 370/395.1 |
| 2003/0137532 | A1* | 7/2003 | Proulx | H04L 29/06 715/735 |
| 2004/0034800 | A1* | 2/2004 | Singhal | H04L 63/1408 726/23 |
| 2005/0068890 | A1* | 3/2005 | Ellis | H04L 12/2602 370/229 |
| 2005/0213501 | A1* | 9/2005 | Fontana | H04L 41/5003 370/229 |
| 2006/0059163 | A1* | 3/2006 | Frattura | H04L 12/2602 |
| 2006/0072543 | A1* | 4/2006 | Lloyd | H04L 12/2602 370/351 |
| 2006/0168612 | A1* | 7/2006 | Chapman | G06F 11/0709 725/11 |
| 2007/0118643 | A1* | 5/2007 | Mishra | H04L 41/082 709/224 |
| 2008/0273548 | A1* | 11/2008 | Leano | H04L 12/2801 370/442 |
| 2009/0133049 | A1* | 5/2009 | Bradley | H04N 7/162 725/28 |
| 2009/0168783 | A1* | 7/2009 | Mohan | H04L 12/4633 370/395.5 |
| 2009/0296578 | A1* | 12/2009 | Bernard | H04L 41/509 370/231 |
| 2010/0061378 | A1* | 3/2010 | Joyner | H04L 12/4633 370/395.53 |
| 2010/0083330 | A1* | 4/2010 | Bernstein | H04N 7/17309 725/111 |
| 2010/0135265 | A1* | 6/2010 | Asati | H04L 12/2801 370/338 |
| 2011/0107172 | A1* | 5/2011 | Chapman | H04N 7/52 714/752 |
| 2011/0116419 | A1* | 5/2011 | Cholas | H04M 3/533 370/259 |
| 2011/0131624 | A1* | 6/2011 | Wu | H04L 41/0226 725/111 |
| 2011/0134938 | A1* | 6/2011 | Campos | H04J 3/1647 370/474 |
| 2011/0145394 | A1* | 6/2011 | Krzanowski | H04L 12/4625 709/224 |
| 2013/0074138 | A1* | 3/2013 | Chapman | H04L 12/2801 725/111 |
| 2013/0114480 | A1* | 5/2013 | Chapman | H04L 5/1469 370/282 |
| 2013/0163426 | A1* | 6/2013 | Beliveau | H04L 67/327 370/235 |
| 2013/0163427 | A1* | 6/2013 | Beliveau | H04L 67/327 370/235 |
| 2013/0163475 | A1* | 6/2013 | Beliveau | H04L 67/327 370/257 |
| 2013/0276047 | A1* | 10/2013 | Chapman | H04N 21/42676 725/111 |
| 2014/0006593 | A1* | 1/2014 | Sarawat | H04M 15/58 709/224 |
| 2014/0334822 | A1* | 11/2014 | Hajduczenia | H04L 12/2876 398/58 |
| 2015/0120916 | A1* | 4/2015 | Frattura | H04L 67/1095 709/224 |

FOREIGN PATENT DOCUMENTS

| | | |
|---|---|---|
| CN | 102624560 | 8/2012 |
| CN | 102624560 A | 8/2012 |
| WO | WO 2011031831 | 3/2011 |

OTHER PUBLICATIONS

"Configure, v." OED Online. Oxford University Press, Mar. 2016. Web. Mar. 31, 2016. <http://www.oed.com/view/Entry/38830#eid8497233>.*
International Search Report dated Jun. 27, 2013.

* cited by examiner

CABLE TV NETWORK BROADBAND ACCESS SYSTEM WITH DISTRIBUTED DEPLOYMENT AND CENTRALIZED CONTROL

CROSS-REFERENCE

This application is a U.S. National Stage of International Application No. PCT/CN2013/072434 filed Mar. 12, 2013, which claims the benefit of CN 201210063644.6 filed Mar. 12, 2012.

FIELD OF THE INVENTION

The present invention relates to the communications field, particularly to a cable TV network broadband access system with distributed deployment and centralized control.

BACKGROUND OF THE INVENTION

Along with the continuous advance of the "triple play", the cable TV access network will gradually move towards the Next Generation Broadcasting (NGB) by transforming the two-way network. By the network transformation and integration, the radio and TV operator would not only be able to inherit the original video business, but also be able to provide various types of value-added services, such as data, VOIP, IPTV, VOD and network games, etc. In order to make full use of the existing coaxial resources, the broadband access technology based on the coaxial cable has become to be the preferred solution of the "two-way broadcasting network transformation". By using the existing cable TV coaxial cable as the transmission media for transmitting the TV and the bi-directional data signals simultaneously, the difficulty and intensity of the two-way network transformation can be greatly decreased, and thus this technology can be applied to residential area, hotel, hospital, apartment house, office, etc., where has laid the cable TV coaxial network.

The existing broadband access technology based on the coaxial cable mainly comprises two types. One is the system based on Cable Modem Terminal Systems (CMTS) and Cable Modem (CM) devices which has a two-stage architecture comprising a head end and a terminal end; it uses protocol architectures such as ITU-T J.122, J.222, etc., and can realize the broadband data transmission based on Hybrid Fiber-Coaxial (HFC) network. The CMTS devices based on the protocol architecture such as IUT-T J.122, J.222 etc., are, however, normally designed for the large user units with scale of thousands of users, and thus the cost of those devices used for the user unit with generally only tens or hundreds of users is difficult to be beard by the operator. Therefore, the excessive cost of average bandwidth per user is one of the main obstacles of large-scale application of the CMTS devices. Furthermore, the mass noise of the CMTS devices located in the center computer room or the sub-center computer room under special network environment (e.g., Chinese network environment) is also an obstacle to provide high quality services. The other one is the system based on Ethernet over Coax (EoC) technology which has a two-stage architecture comprising a head end and a terminal end, and the existing numerous EoC standards comprise HomePlugAV, HomePlugBPL, HomePNA, MoCA, WIFI frequency reduction, etc., each of which has advantages and disadvantages in technology and has applied respectively in the radio and TV network to a certain degree around the country. Along with the integration of the radio and TV network, the lack of a unified EoC standard is disadvantageous to the interoperability, upgrade and maintenance of the radio and TV network as well as the healthy development of the whole industry chain. Moreover, the EoC technology also has defects in bandwidth, QoS assurance, manageability and the supported number of users.

Along with the further development of the radio and TV network integration and the large-scale operation of the three network convergence, the cable TV access network needs to satisfy the operating requirements of network compatibility, wide bandwidth service bearing, multiple-service QoS assurance, operability and manageability. In conclusion, those in the prior art can not satisfy these requirements very well.

SUMMARY OF THE INVENTION

In order to solve one of the above problems of the prior art, the present invention provides a cable TV network broadband access system with distributed deployment and centralized control, and said system has a system architecture with three-stage distributed deployment and centralized control, which comprises a system terminal end, a system access end and a system head end. The system provided by the invention can not only realize the end-to-end control management and QoS priority assurance of broadband data service, but can also realize easy network deployment, low comprehensive cost and high management efficiency.

The present invention provides a cable TV broadband access system with distributed deployment and centralized control, comprising:

a system terminal end, configured to receive and transmit uplink and downlink service data, and receive and respond to access control data and management control data;

a system access end, configured to implement data format transformation and data forwarding or processing for said uplink and downlink service data, the system terminal end access control data and the management control data, and transmit, receive and respond to management control data of the system access end;

a system head end, configured to implement management control and access control for said system access end and said system terminal end, and process, converge and forward said uplink and downlink service data.

Preferably, said system comprises a plurality of said system terminal ends, a plurality of said system access ends and a plurality of said system head ends.

Preferably, said system access end is capable of configuring access control and management control functions of said system terminal end, and said system head end is capable of configuring management control function of said system access end, and access control and management control functions of the system terminal end.

Preferably, said system access end of the system according to the present invention comprises:

a data de-encapsulation and encapsulation subsystem, configured to de-encapsulate and encapsulate said uplink and downlink service data, system terminal end access control data or management control data in the format of data packets, and transmit, receive and respond to the management control data of the system access end;

a physical frame generation subsystem, configured to implement frame structure processing, physical layer encapsulating, and physical signal receiving and transmitting for said uplink and downlink service data, system terminal end access control data and management control data.

Said system head end comprises:

a converging-and-forwarding subsystem, configured to converge, route and forward the uplink and downlink service data;

a classifying-and-mapping subsystem, configured to implement the classification and mapping of data streams for the uplink and downlink service data, and the priority control of the service data;

a service configuration subsystem, configured to implement registration and configuration for the system access end and the system terminal end;

a network management subsystem, configured to implement management configuration and state monitoring for the system head end, system access end, system terminal end and all the related devices within the network, and to implement the configuration and management of service priorities and service types for the processing of said uplink and downlink service data inside the system head end and the system access end;

a central control subsystem, configured to implement the configuration and management for all subsystems in the system head end, and to receive, process and transmit the management control data of the system terminal end and system access end, and to implement data format transformation and data forwarding for the management configuration and state monitoring data among the network management subsystem and the system access end and the system terminal end, and to implement data format transformation and data forwarding for the configuration data related service priorities and service types among the network management subsystem and other subsystems, the system access end and the system terminal end;

an access control subsystem, configured to implement an access control, by the system head end, for the system access end and the system terminal end device.

Preferably, the system access end of the system according to the present invention comprises: a physical frame generation subsystem, configured to implement frame structure processing, physical layer encapsulating, and physical signal receiving and transmitting for the uplink and downlink service data, the system terminal end access control data and the management control data; said system head end comprises:

a converging-and-forwarding subsystem, configured to converge, route and forward the uplink and downlink service data;

a classifying-and-mapping subsystem, configured to implement the classification and mapping of data streams for the uplink and downlink service data, and the priority control of the service data;

a service configuration subsystem, configured to implement registration and configuration for the system access end and the system terminal end;

a network management subsystem, configured to implement management configuration and state monitoring for the system head end, system access end, system terminal end and all the associated devices within the network, and to implement the configuration and management of service priorities and service types for the processing of said uplink and downlink service data inside the system head end and the system access end;

a central control subsystem, configured to implement configuration and management for all subsystems in the system head end, and to receive, process and transmit the management control data of the system terminal end and system access end, and to implement data format transformation and data forwarding for the management configuration and state monitoring data among the network management subsystem and the system access end and the system terminal end, and to implement data format transformation and data forwarding for the configuration data with regard to service priorities and service types among the network management subsystem and other subsystems, the system access end and the system terminal end;

an access control subsystem, configured to implement access control, by the system head end, for the system access end and the system terminal end device;

a data de-encapsulation and encapsulation subsystem, configured to de-encapsulate and encapsulate the uplink and downlink service data, system terminal end access control data and management control data in the format of data packets, and to transmit, receive and respond to the management control data of the system access end.

Preferably, in the system based on China Data Over Cable Service Interface Specification (C-DOCSIS), said system terminal end according to the present invention is configured to transmit the service data, access control data and management control data to the coaxial cable media converter (CMC) device in an uplink direction; and receive the service data, access control data and management control data in a downlink direction;

Said system access end comprises a CMC device, and said CMC device comprises: a radio frequency interface module configured to, in an uplink direction, receive service data transmitted by the system terminal end, analyze the C-DOCSIS frames of said service data, implement VLAN information mapping for the frame data, insert a CDT tag to the Ethernet frame headers of said service data and transmit the service data with the inserted CDT tag to a classifying-and-forwarding module, and then transmit the encapsulated C-DOCSIS management message (CDMM) to a system control module; and configured to, in a downlink direction, receive the service data transmitted by said classifying-and-forwarding module, identify the system terminal end and service stream to which the service data belongs according to said CDT tag, implement traffic shaping and scheduling for said service data according to the identified terminal end and service stream, and then transmit said service data to said system terminal end;

said system head end comprises:

a configuration system, configured to provide service opening and device configuration service for the system terminal end, and implement the generating and distributing of configuration files, and software upgrade of said system terminal end;

a network management system, configured to implement configuration, maintenance and monitoring of network devices;

a convergence device, comprising:

a classifying-and-forwarding module, configured to, in an uplink direction, map a CDT tag to the service label supported by the convergence network and transmit it to the convergence network; and configured to, in a downlink direction, implement VLAN TAG information stripping for the Ethernet frames of the service data transmitted by the convergence network, and to implement data stream characteristic matching for said frames, and thus classify the frames according to the matched data stream characteristics, and to insert a CDT tag to the Ethernet frame headers of the service data for identifying a particular service stream of a particular terminal end, and transmit the service data with the inserted CDT tag to a radio frequency forwarding module;

a system control module, configured to configure and manage the radio frequency interface module and the classifying-and-forwarding module, and transmit a response frame responsive to the encapsulated C-DOCSIS management message (CDMM) transmitted by said radio frequency interface module.

Preferably, in the system based on C-DOCSIS, the system terminal end according to the present invention is configured to, in an uplink direction, transmit the service data, access control data and management control data to a CMC device; and configured to, in a downlink direction, receive the service data, access control data and management control data.

Said system access end comprises a CMC device, and said CMC device comprises: a system control module, configured to configure and manage the radio frequency interface module and the classifying-and-forwarding module, and transmit a response frame responsive to the encapsulated management message (CDMM) transmitted by said radio frequency interface module;

a classifying-and-forwarding module, configured to, in an uplink direction, map said CDT tag to the service label supported by the convergence network and transmit it to the convergence network; and configured to, in a downlink direction, implement VLAN TAG information stripping for the Ethernet frames of the service data transmitted by the convergence network, and to implement data stream characteristic matching for said frames, classify the frames according to the matched data stream characteristics, and to insert a CDT tag to the Ethernet frame headers of the service data for identifying a particular service stream of a particular system terminal, and transmit said service data with the inserted CDT tag to the radio frequency forwarding module;

a radio frequency interface module, configured to, in an uplink direction, receive service data transmitted by the system terminal end, analyze the C-DOCSIS frames of said service data, and implement VLAN information mapping for the frame data, and insert a CDT tag to the Ethernet frame headers of said service data and transmit the service data with the inserted CDT tag to the classifying-and-forwarding module, and then transmit the encapsulated CDMM to the system control module; and configured to, in a downlink direction, receive the service data transmitted by said classifying-and-forwarding module, identify the system terminal end and service stream to which the service data belongs according to said CDT tag, implement traffic shaping and scheduling for said service data according to the identified terminal end and service stream, and then transmit said service data to said system terminal end;

Said system head end, comprises:

a configuration system, configured to provide service opening and device configuration service for the system terminal end, and implement the generating and distributing of configuration files, and software upgrade of said system terminal end;

a network management system, configured to implement configuration, maintenance and monitoring of network devices;

a converging-and-forwarding device, configured to complete access to the metropolitan area network.

The present invention provides a cable TV network broadband access system with distributed deployment and centralized control, said system has a system architecture with three-stage distributed deployment and centralized control which comprises a system terminal end, a system access end and a system head end. Compared to the existing cable TV network broadband access technology in which a two-stage architecture only comprising a system terminal end and a system head end is normally used, said system provided by the present invention can not only realize the end-to-end control management and QoS priority assurance of the broadband data service, but realize easy network deployment, low comprehensive cost and high management efficiency.

BRIEF DESCRIPTION OF THE DRAWINGS

The above said and/or additional aspects and advantages will become obvious and be easily understood from the following description of the embodiments in combination with the accompanying drawings, wherein.

DETAILED DESCRIPTION OF PREFERRED EMBODIMENTS

The embodiments of the present invention will be described in detail. Examples of said embodiments are shown in the accompanying drawings, and the same or similar reference represents the same or similar element or elements with same or similar functions throughout the disclosure. In the following, the described embodiments referring to the accompanying drawings are exemplary and only used to illustrate the present invention, but not intend to be interpreted as the limit of the present invention.

The First Embodiment

Figure 1:
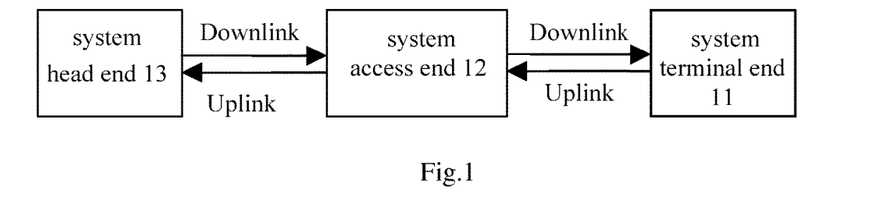
FIG. 1 is an architecture diagram of the cable TV network broadband access system with distributed deployment and centralized control according to the first embodiment of the present invention.

The cable TV network broadband access system with distributed deployment and centralized control according to the first embodiment of the present invention is shown in FIG. 1. Referring to FIG. 1, said system comprises: a system terminal end 11, configured to receive and transmit the uplink and downlink service data, and receive and respond to the access control data and management control data; a system access end 12, configured to implement data format transformation and data forwarding or processing for said unlink and downlink service data, system terminal end access control data and management control data, and to transmit, receive and respond to management control data from the system access end; a system head end 13, configured to implement management control and access control for said system access end and said system terminal end, and to process, converge and forward said uplink and downlink service data.

The cable TV network broadband access system provided by the present invention has a system architecture of three-stage distributed deployment and centralized control consisting of the system terminal end, the system access end and the system head end, and it can not only realize the end-to-end control management and QoS priority assurance of the broadband data service, but also realize easy network deployment, low comprehensive cost and high management efficiency.

In embodiments according to the present invention, the access control data denotes, at initial stage of operation, various types of communication data between the system terminal end as a part of the whole network system and the system head end as well as between the system terminal end and the system access end, including but not limited to, data regarding whether the system terminal end is permitted to join the system, data regarding which transmission protocol is applied to the system terminal end after deployed in the system, and the communication timeslot and bandwidth allocated to the system terminal end.

The management control data means the data associated with work state, device parameters and the like of the system terminal end between the system terminal end and the system access end or the system head end. The data processing includes but not limited to data classifying and mapping, data analyzing, data encapsulating and de-encapsulating.

Preferably, the system access end 12 is capable of configuring access control and management control functions of the system terminal end 11, and the system head end 13 is capable of configuring management control functions of the system access end 12, access control and management control functions of the system terminal end 11, wherein configuring the functions means that the access control and management control functions may be flexibly configured by the system head end, which includes but not limited to the scopes of functions, the option and threshold values of configuration parameters, the utilized data transmission protocols and types, and the supportable function expansion and upgrade.

Preferably, the system head end 13 may manage and control only one type of system access end 12 or may manage and control many different types of system access end 12 simultaneously. The function of the system access end may be determined by one or more of the following subsystems with different function scopes, including but not limited to physical frame generation subsystem, data de-encapsulation and encapsulation subsystem, access control subsystem and classifying-and-mapping subsystem, as the subsystems with different function scopes may be used to constitute many different types of system access ends. The system head end may manage and control one type of system access end or may manage and control many different types of system access end simultaneously.

Preferably, said system head end 13 may intelligently adapt to and support the data transmission protocol between the system terminal end 11 and the system access end 12.

Specifically, the data transmission protocol between said system head end 13 and said system access end 12 may be configurable, and the data transmission protocol may be IP protocol, Ethernet protocol, EPON protocol, GPON protocol, NGPON protocol, 10GEPON protocol, WDM-PON protocol and private protocol. The transmission media between said system head end 13 and said system access end 12 may be optical fiber, coaxial cable or the combination thereof.

The data transmission protocol between said system access end 12 and said system terminal end 11 may be constant or configurable, said data transmission protocol may include C-DOCSIS protocol, DOCSIS protocol, HiNOC protocol, HomePlugAV protocol and other open or private protocol based on the cable TV Cable network. The transmission media between said system access end 12 and said system terminal end 11 may be optical fiber, coaxial cable or the combination thereof.

The Second Embodiment

Figure 2:
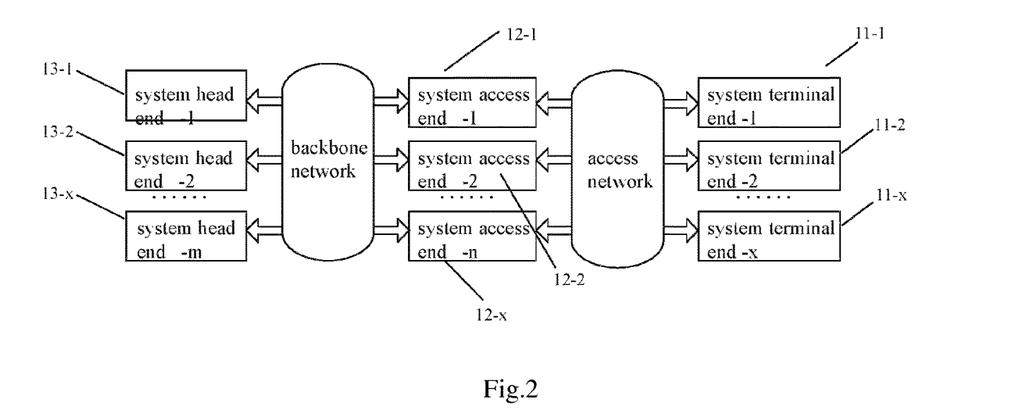
FIG. 2 is an architecture diagram of the cable TV network broadband access system with distributed deployment and centralized control according to the second embodiment of the present invention.

Referring to FIG. 2, the system architecture diagram is provided according to the second embodiment of the present invention. Said system may also comprise multiple system terminal ends 11-1, 11-2, 11-$x$, multiple system access ends 12-1, 12-2, 12-$n$, and multiple system head ends 13-1, 13-2, 13-$m$, and this network-style three-stage distributed deployment architecture is applicable to the large-scale cable TV metropolitan area network and access network system.

The Third Embodiment

Figure 3:
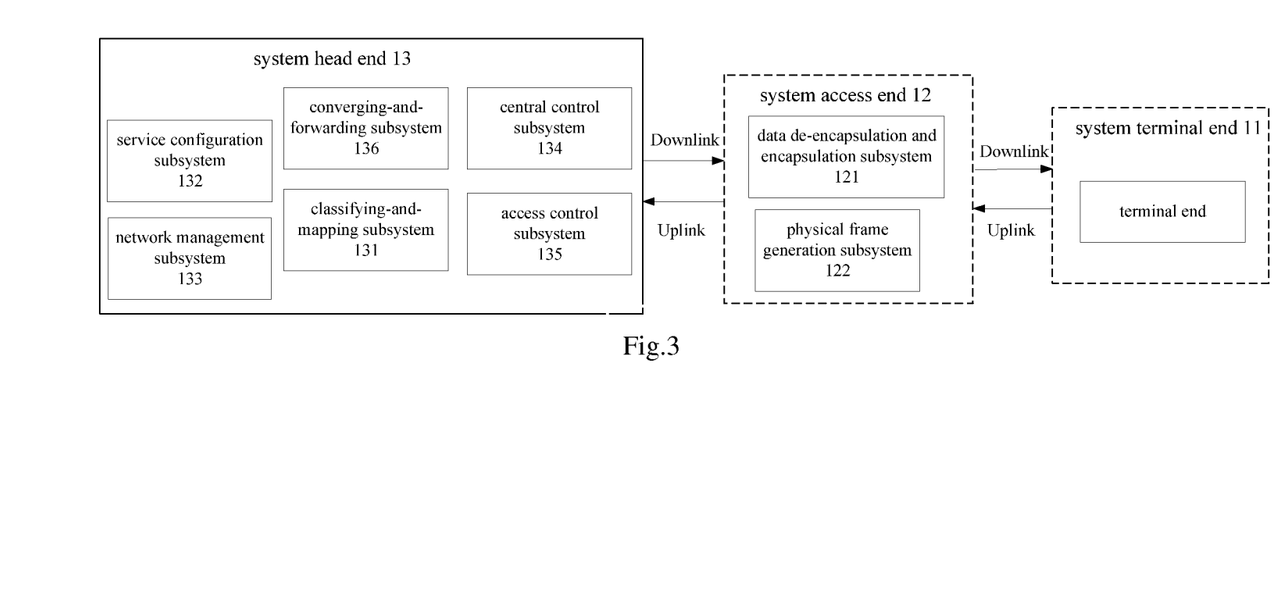
FIG. 3 is an architecture diagram of the cable TV network broadband access system with distributed deployment and centralized control according to the third embodiment of the present invention.

Referring to FIG. 3, the system architecture diagram according to the third embodiment of the present invention is provided. Said system comprises a system access end 12, comprising: a data de-encapsulation and encapsulation subsystem 121, configured to de-encapsulate and encapsulate data packets of uplink and downlink service data, system terminal end access control data and management control data, and to transmit, receive and respond to management control data of the system access end; a physical frame generation subsystem 122, configured to implement frame structure processing, physical layer encapsulating, and physical signal receiving and transmitting for said uplink and downlink service data, system terminal end access control data and management control data.

The system head end 13 comprises: a converging-and-forwarding subsystem 136, configured to converge, route and forward the uplink and downlink service data; a classifying-and-mapping subsystem 131, configured to implement classification and mapping of data streams for the uplink and downlink service data to perform priority control of the service data; a service configuration subsystem 132, configured to implement registration and configuration for the system access end and the system terminal end; a network management subsystem 133, configured to implement management configuration and state monitoring for the system head end, the system access end, the system terminal end and all the related devices within the network, and to implement the configuration and management of service priorities and service types for the processing of said uplink and downlink service data inside the system head end and the system access end; a central control subsystem 134, configured to implement configuration and management for all subsystems in the system head end, and to receive, process and transmit the management control data of the system terminal end and system access end, and to implement data format transformation and data forwarding for the management configuration and state monitoring data between the network management subsystem and the system access end and between the network management subsystem and the system terminal end, and to implement data format transformation and data forwarding for the configuration data associated with service priorities and service types among the network management subsystem and other subsystems, the system access end and the system terminal end; a access control subsystem 135, configured to implement access control of the system access end and the system terminal end device to the system head end.

The system terminal end 11 is generally designed to be an integrated structure, which is used to receive and transmit uplink and downlink service data, and receive and respond to access control data and management control data.

The Fourth Embodiment

Figure 4:
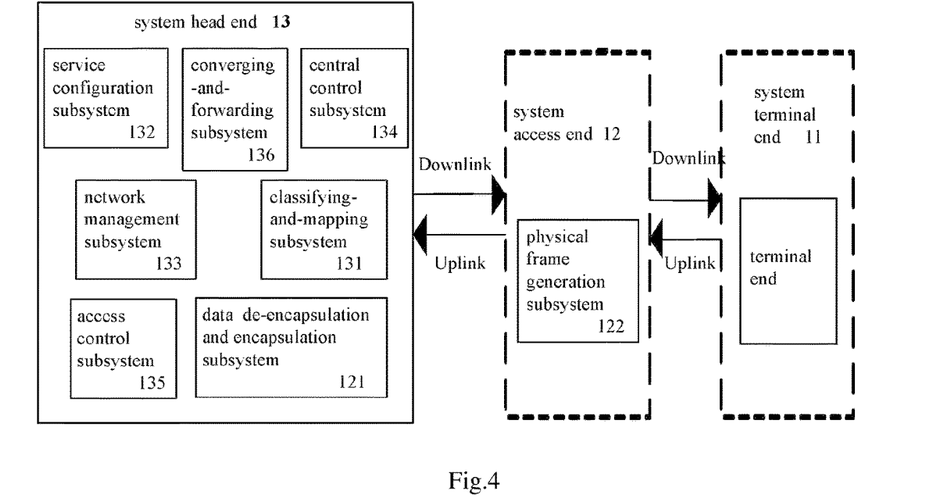
FIG. 4 is an architecture diagram of the cable TV network broadband access system with distributed deployment and centralized control according to the fourth embodiment of the present invention.

Referring to FIG. 4, the system architecture diagram of the fourth embodiment of the present invention is provided. According to the system requirement, the data de-encapsulation and encapsulation subsystem 121 may also be configured within a system head end 13, and a system access end 12 is mainly responsible for physical frame generating of the service data. This architecture can further simplify the structure of the system access end 12, thus improving the work efficiency and reducing the network deployment cost.

The system comprises a system access end 12, comprising: a physical frame generation subsystem 122, configured to implement frame structure processing, physical layer encapsulating, and physical signal receiving and transmitting for uplink and downlink service data, system terminal end access control data and management control data.

The system head end 13 comprises: a converging-and-forwarding subsystem 136, configured to converge, route and forward the uplink and downlink service data; a classifying-and-mapping subsystem 131, configured to implement the classification and mapping of data streams for the uplink and downlink service data to perform the priority control of the service data; a service configuration subsystem 132, configured to implement registration and configuration for the system access end and the system terminal end; a network management subsystem 133, configured to implement management configuration and state monitoring for the system head end, the system access end, the system terminal end and all the related devices within the network, and to implement configuration and management of service priorities and service types for the processing of said uplink and downlink service data inside the system head end and the system access end; a central control subsystem 134, configured to implement configuration and management for all subsystems in the system head end, and to receive, process and transmit the management control data of the system terminal end and system access end, and to implement data format transformation and data forwarding for the management configuration and state monitoring data between the network management subsystem and the system access end and between the network management subsystem and the system terminal end, and to implement data format transformation and data forwarding for the configuration data related to service priorities and service types among the network management subsystem and other subsystems, the system access end and the system terminal end; an access control subsystem 135, configured to control access of the system access end and the system terminal end device to the system head end; a data de-encapsulation and encapsulation subsystem 121, configured to de-encapsulate and encapsulate data packets of the uplink and downlink service data, system terminal end access control data and management control data, and transmit, receive and respond to the management control data of the system access end.

The Fifth Embodiment

Figure 5:
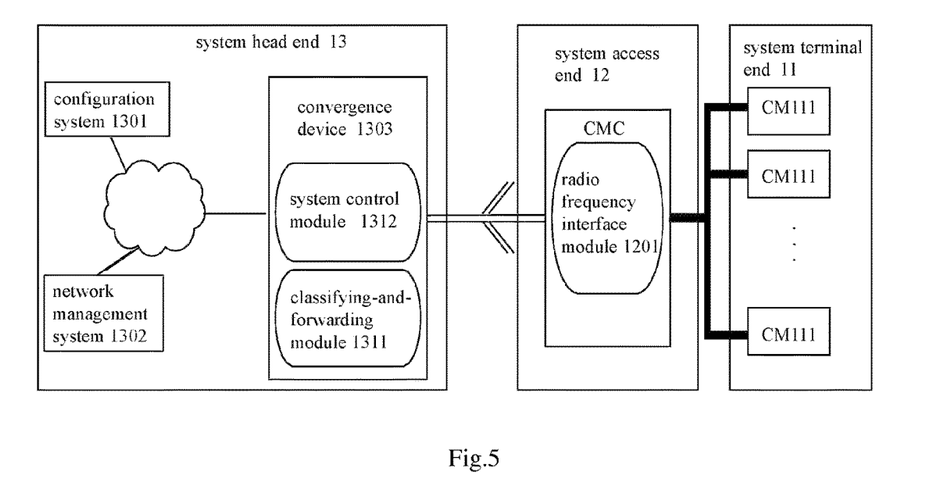
FIG. 5 is an architecture diagram of the cable TV network broadband access system with distributed deployment and centralized control according to the fifth embodiment of the present invention.
Figure 6:
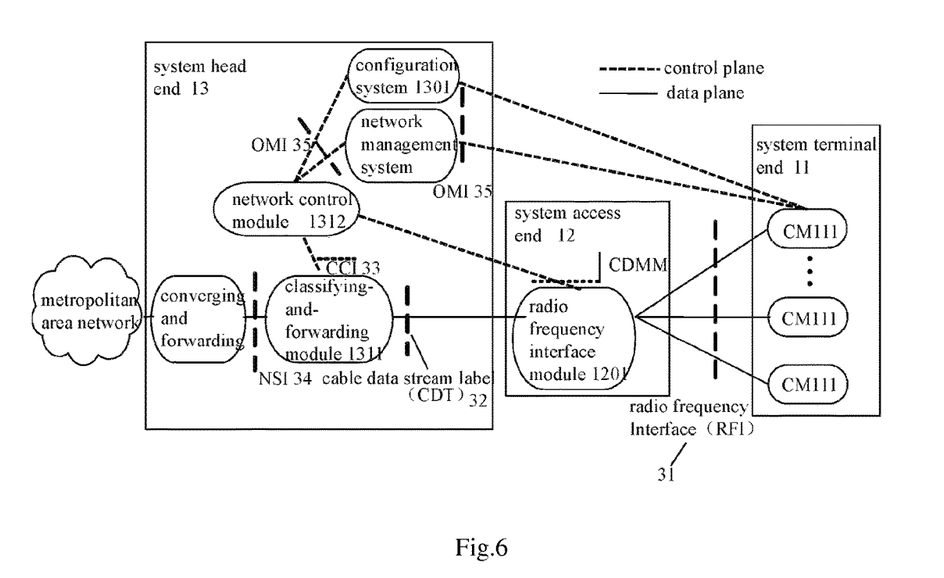
FIG. 6 is another architecture diagram according to the fifth embodiment of the present invention.

Referring to FIG. 5 and FIG. 6, the system architecture diagrams based on C-DOCSIS system according to the fifth embodiment of the present invention are provided, wherein the system terminal end 11 includes a plurality of cable modems (CMs) 111, the cable modem being configured to, in an uplink direction, transmit service data, access control data and management control data to a coaxial cable media converter (CMC) device; and configured to, in a downlink direction, receive service data, access control data and management control data.

The system access end 12 comprises a CMC device, and the CMC device comprises: a radio frequency interface module 1201 configured to, in an uplink direction, receive the service data transmitted by the system terminal end 11, analyze the C-DOCSIS frames of said service data, implement VLAN information mapping for the frame data, insert a CDT tag to the Ethernet frame headers of said service data and transmit the service data with the inserted CDT tag to the classifying-and-forwarding module 1311, and then transmit the encapsulated C-DOCSIS management message (CDMM) to the system control module 1312; and configured to, in a downlink direction, receive the service data transmitted by the classifying-and-forwarding module 1311, identify the system terminal end 11 and service stream to which the service data belongs according to said CDT tag, implement traffic shaping and scheduling for said service data according to the identified terminal end 11 and service stream, and then transmit said service data to said system terminal end 11.

The system head end 13 comprises: a configuration system 1301, configured to provide service opening and device configuration service for the system terminal end 11, and to generate and distribute a configuration file, and to upgrade a software of said system terminal end 11; a network management system 1302, configured to implement configuration, maintenance and monitoring of network devices; a convergence device 1303, comprising: a classifying-and-forwarding module 1311 configured to, in an uplink direction, map the CDT tag to the service label supported by a convergence network and transmit it to the convergence network; and configured to, in a downlink direction, implement VLAN TAG information stripping the Ethernet frames of the service data transmitted by the convergence network, implement data stream characteristic matching for said frames and classify the frames according to the matched data stream characteristics, and insert a CDT tag to the Ethernet frame headers of the service data for identifying a particular service stream of a particular terminal end 11, and transmit said service data with the inserted CDT tag to the radio frequency forwarding module 1201; a system control module 1312, configured to configure and manage the radio frequency interface module 1201 and the classifying-and-forwarding module 1311.

By applying the distributed architecture of the present embodiment, in which the CMC device is located close to the user side of the network, such as the specified sites of a building or an optical node of the cell in the cable TV HFC network, the function of the radio frequency module in the system head end can be realized, and meanwhile the functions of the system control module and the classifying-and-forwarding module can be realized by using the convergence network device. Also, by applying the distributed architecture, the convergence device can provide the centralized management interfaces for all CMC devices, and perform some important control functions such as dynamic QoS interfaces and DHCP relays, thereby simplifying the network configuration. Furthermore, the CMC device used in this type of distributed architecture does not need the system control module and the classifying module, thereby reducing the cost and complexity and improving the reliability of the device. Additionally, due to the unified management on the convergence device, the unified configuration for the QoS of the whole access network can be implemented. The CMs conforming to the C-DOCSIS standard are utilized in the system terminal end to realize the function of the cable terminal. In the present system, the convergence device may be an OLT, a switcher and a router of the PON system; the physical channel between the convergence device and the CMC may be PON optical network and Gigabit Ethernet; and the transmission between the CMC and CMs adopts the C-DOCSIS protocol.

The Sixth Embodiment

Figure 7:
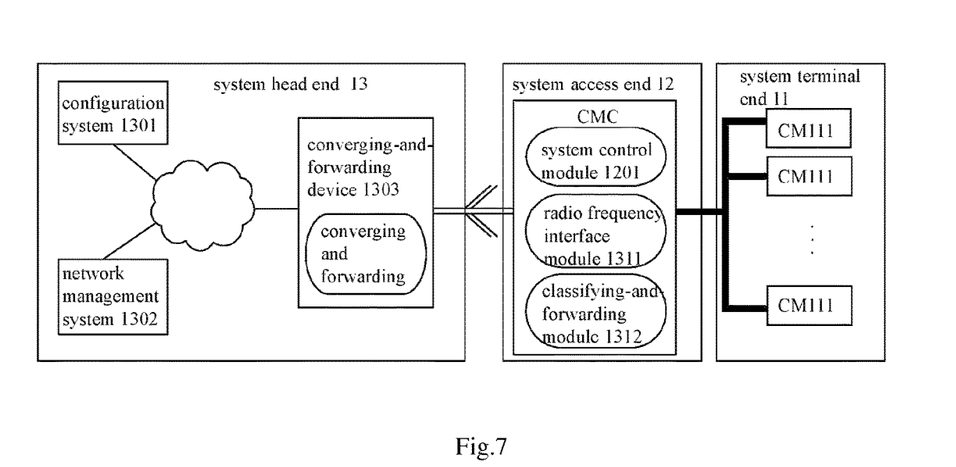
FIG. 7 is an architecture diagram of the cable TV network broadband access system with distributed deployment and centralized control according to the sixth embodiment of the present invention.

Referring to FIG. 7, the architecture diagram according to the sixth embodiment of the present invention is provided. The present embodiment is also based on the C-DOCSIS system, and what differs from the fifth embodiment is that the system control module 1201, the classifying-and-forwarding module 1312 and the radio frequency interface module 1311 in the system of the present embodiment are centralized into one CMC device so as to realize the function of the system access end, and the converging-and-forwarding device 1303 only provides IP tunnels so that the converging-and-forwarding device may be a commonly used one, such as an OLT, an Ethernet switcher or a router, and no specialized development is required.

The system terminal end 11 may include cable modems (CMs) 111. The cable modem (CM) may be configured to, in an uplink direction, transmit service data, access control data and management control data to the CMC device; in a downlink direction, receive service data, access control data and management control data;

The system access end 12 comprises a CMC device, comprising: a system control module 1201, configured to configure and manage a radio frequency interface module 1311 and a classifying-and-forwarding module 1312, and transmit a response frame responsive to the encapsulated management message (CDMM) transmitted by the radio frequency interface module 1311; a classifying-and-forwarding module 1312, configured to, in a uplink direction, map a CDT tag to the service label supported by the convergence network and transmit it to the convergence network; and in a downlink direction, implement VLAN TAG information stripping for the Ethernet frames of the service data transmitted by the convergence network, implement data stream characteristic matching for said frames, and classify the frames according to the matched data stream characteristics, insert a CDT tag to the Ethernet frame headers of the service data for identifying a particular service stream of a particular system terminal 11, and transmit said service data with the inserted CDT tag to the radio frequency forwarding module 1312; a radio frequency interface module 1311, configured to, in an uplink direction, receive service data transmitted by the system terminal end 11, analyze the C-DOCSIS frames of said service data, implement VLAN information mapping for the frame data, insert a CDT tag to the Ethernet frame headers of said service data and transmit the service data with the inserted CDT tag to the classifying-and-forwarding module 1312, and then transmit the encapsulated CDMM to the system control module 1201; and configured to, in a downlink direction, receive the service data transmitted by said classifying-and-forwarding module 1312, identify the system terminal end 11 and service stream to which the service data belongs according to said CDT tag, implement the traffic shaping and scheduling for said service data according to the identified terminal 11 and service stream, and then transmit said service data to the system terminal end 11.

The system head end 13 comprises: a configuration system 1301, configured to provide service opening and device configuration service for the system terminal end 11, generate and distribute the configuration file and upgrade the software of the system terminal end 11; a network management system 1302, configured to implement configuration, maintenance and monitoring of the network devices; and a converging-and-forwarding device 1303, configured to implement access to the metropolitan area network.

In the fifth and sixth embodiments respectively shown in FIG. 5 and FIG. 6, CM is a user side device in communication with the radio frequency interface module via the coaxial cable for implementing the access of the user side device. In case of applying the C-DOCSIS technology, CM is a CM module compatible with ITU-T J.122 and J.222 standards.

Further, said CDT (C-DOCSIS Data Tag) label defines the identity format of the data plane between said classifying-and-forwarding module and said radio frequency interface module, and the CDT label uses the 802.1P/Q VLAN label format. Said CDT label includes a CoS field and a VID field, wherein said CoS field is a service stream reference identifier and said VID field is a terminal end identifier, and said CoS field in combination with said CoS field specifies a particular system terminal end and a particular service stream.

Further, the CDMM (C-DOCSIS Management Message) defines the control message and message format between the system control module and the radio frequency interface module. The CDMM message is configured to exchange configuration, state and management information between the system control module and the radio frequency interface module, including channel and parameter configuration, state and statistic of transmission and reception, load balancing, cable modem state, cable modem registration information, dynamic service stream operation, multicast and security information, etc.

In said radio frequency interface module, if the length of a CDMM is longer than the maximum transmission length of the transmission layer, the frame fragmentation is executed to said CDMM, each fragment being one protocol data unit (PDU) of said CDMM. Said CDMM comprises a first PDU and subsequent PDUs, and the smaller CDMMs obtained by the fragmentation are encapsulated respectively.

Further, said configuration system provides the business service and device configuration service for the whole coaxial cable access system, and implements the generating and distributing of configuration files and software upgrade of the terminal device. The configuration system may comprise a DHCP server, a configuration file server, a software download server, a clock agreement server and a policy server, wherein the DHCP server is configured to provide initialization starting configuration information for the cable terminal and the user device, mainly including IP address; the configuration file server is configured to provide configuration file download for starting up the cable terminal, and the configuration file may include the configuration parameters of the cable terminal; the software download server is configured to provide software download for upgrading the cable terminal; and the clock agreement server is a clock agreement client configured to mainly provide correct time for the cable terminal.

Said network management system mainly comprises a SNMP management system and a Syslog server, wherein the SNMP management system may configure and monitor the system head end and the cable terminals by using the SNMP protocol; and the Syslog server is configured to collect the information related to the device operation.

Further referring to FIG. 6, said system terminal end 11 communicates with said system access end 12 via the radio frequency interface (RFI). Said radio frequency interface 1311 defines the interface specifications of the MAC layer and the PHY layer between said system access end 12 and said system terminal end 11. Said radio frequency interface module 1311 may also define only the interface specification of the PHY layer between said system access end 12 and said system terminal end 11. The classifying-and-forwarding module 1312 of said system head end 13 defines the interface specification of the MAC layer between said system access end 12 and the system terminal end 13.

Further, said system head end 13 communicates with said convergence network via the network side interface (NSI) 34, and said network side interface 34 defines the physical interface and service stream mapping logic between said system head end 13 and the convergence network. Said physical interface may be a physical interface of Gigabit Ethernet, ten Gigabit Ethernet, EPON, GPON or 10G PON. Said service stream mapping logic may define the mapping relationships between the coaxial cable service stream and convergence network VLAN.

When the system access end forwards data to the NSI, the data packets may carry VLAN field or no VLAN field, and if the data message carries VLAN field, the system head end can support mapping the coaxial cable uplink service stream to VLAN ID corresponding to NSI, and mapping the service stream priority to the VLAN priority. The system access end can also modify the uplink and downlink IP priority (TOS/DSCP), and the converging-and-forwarding device can execute priority scheduling based on the VLAN priority or IP priority (TOS/DSCP).

Further, said system head end 13 communicates with said network management system 1302 and said configuration system 1301 via an operation management interface (OMI) 35. The network management system uses the SNMP protocol and command line interface to configure, maintain and monitor the network devices via the OMI interface. The configuration system provides configuration service for the service opening via the OMI interface. In the C-DOCSIS system, the CM acquires dynamic addresses through DHCP, and the CM acquires configuration file through TFTP at the time of registration online; the policy server uses common opening policy service (COPS) protocol to communicate with the system access end via the OMI interface, and the system access end establishes C-DOCSIS dynamic service streams, thus the dynamic QoS assurance of service is realized.

Further, said system control module 1312 communicates with said classifying-and-forwarding module 1311 via a control and classifying-and-forwarding (CCI) 33 interface. In the C-DOCSIS system, the system control module configures, via the CCI, the classifying-and-forwarding module correspondingly based on the C-DOCSIS service stream information reported by the radio frequency interface module. Meanwhile, the classifying-and-forwarding module extracts particular protocol packets required by the system control function, such as DHCP packets and CPD packets, to the system control module.

The cable TV network broadband access system according to the present invention with distributed deployment and centralized control has the system architecture with three-stage distributed deployment and centralized control which comprises a system terminal end, a system access end and a system head end. Compared to the existing cable TV network broadband access technology in which a two-stage architecture only consisting of the system terminal end and the system head end is normally used, said system provided by the present invention can not only realize the end-to-end control management and QoS priority assurance of the broadband data service, but also realize easy network deployment, low comprehensive cost and high management efficiency. The above description only provides the preferred embodiments of the present invention, it should be noted that for an ordinary person skilled in the art, some modifications and alterations may be made without departing from the principle of the present invention, and these modifications and alterations should also be regarded as falling into the protection scope of the present invention.

What is claimed is:

1. A cable TV network broadband access system with distributed deployment and centralized control, characterized in that, comprising:

a system terminal end, configured to receive and transmit uplink and downlink service data, and receive and respond to access control data and management control data;

a system access end, configured to implement data format transformation and data forwarding or processing for said uplink and downlink service data, said access control data and said management control data of said system terminal end, and transmit, receive and respond to management control data of the system access end;

a system head end, configured to implement management control and access control for said system access end and said system terminal end, and to process, converge and forward said uplink and downlink service data, wherein said system head end is capable of configuring management control functions of the system access end, and access control and management control functions of said system terminal end;

a data transmission protocol between said system head end and said system access end which comprises IP protocol, Ethernet protocol, EPON protocol, GPON protocol, NGPON protocol, 10GEPON protocol, WDM-PON protocol and private protocol, is configurable, and the type of the data transmission protocol is adjustable; a data transmission protocol between said system access end and said system terminal end which includes C-DOCSIS protocol, DOCSIS protocol, HiNOC protocol, HomePlugAV protocol and other open or private protocol based on the cable TV broadband network, is configurable;

wherein the access control data denotes, at initial stage of operation, various types of communication data between the system terminal end as a part of the whole network system and the system head end as well as between the system terminal end and the system access end, including data regarding whether the system terminal end is permitted to join the system, data regarding which transmission protocol is applied to the system terminal end after deployed in the system, and the communication timeslot and bandwidth allocated to the system terminal end; and the management control data means the data associated with work state and device parameters of the system terminal end between the system terminal end and the system access end or the system head end;

said system access end comprises:
  a data de-encapsulation and encapsulation subsystem, configured to de-encapsulate and encapsulate a data packets of said uplink and downlink service data, said access control data and management control data of said system terminal end, and transmit, receive and respond to the management control data of the system access end;
  a physical frame generation subsystem, configured to implement frame structure processing, physical layer encapsulating, and physical signal receiving and transmitting for said uplink and downlink service data, said access control data and said management control data of said system terminal end; and said system head end comprises:
  a converging-and-forwarding subsystem, configured to converge, route and forward the uplink and downlink service data;
  a classifying-and-mapping subsystem, configured to implement the classification and mapping of data streams for said uplink and downlink service data to perform the priority control of said service data;
  a service configuration subsystem, configured to implement registration and configuration for said system access end and said system terminal end;
  a network management subsystem, configured to implement management configuration and state monitoring for said system head end, said system access end, said system terminal end and all the related devices within the network, and to implement configuration and management of service priorities and service types for the processing of said uplink and downlink service data inside said system head end and said system access end;
  a central control subsystem, configured to implement configuration and management for all subsystems in said system head end, and to receive, process and transmit said management control data of said system terminal end and said system access end, and to implement data format transformation and data forwarding for the management configuration and state monitoring data among the network management subsystems and the system access end and the system terminal end, and data format transformation and data forwarding for the configuration data related to service priorities and service types among said network management subsystem and other subsystems, said system access end and said system terminal end;
  an access control subsystem, configured to implement access control of said system access end and said system terminal end device to said system head end.

2. The system according to claim 1, characterized in that said system access end is capable of configuring access control and management control functions of said system terminal end.

3. The system according to claim 1, characterized in that said system head end may manage and control one type of system access end, or manage and control many different types of system access ends simultaneously.

4. The system according to claim 1, characterized in that said system head end intelligently adapts to and supports a data transmission protocol between said system terminal end and said system access end.

5. The system according to claim 1, characterized in that a transmission media between said system head end and said system access end includes optical fiber, coaxial cable or the combination thereof.

6. The system according to claim 1, characterized in that a transmission media between said system access end and said system terminal end includes optical fiber, coaxial cable or the combination thereof.

7. The system according to claim 1, characterized in that said system comprises multiple said system terminal ends, multiple said system access ends and multiple said system head ends.

8. A cable TV network broadband access system with distributed deployment and centralized control, characterized in that, comprising:
  a system terminal end, configured to receive and transmit uplink and downlink service data, and receive and respond to access control data and management control data;
  a system access end, configured to implement data format transformation and data forwarding or processing for said uplink and downlink service data, said access control data and said management control data of said system terminal end, and transmit, receive and respond to management control data of the system access end;
  a system head end, configured to implement management control and access control for said system access end and said system terminal end, and to process, converge and forward said uplink and downlink service data, wherein said system head end is capable of configuring management control functions of the system access end, and access control and management control functions of said system terminal end;
  a data transmission protocol between said system head end and said system access end which comprises IP protocol, Ethernet protocol, EPON protocol, GPON protocol, NGPON protocol, 10GEPON protocol, WDM-PON protocol and private protocol, is configurable, and the type of the data transmission protocol is adjustable; a data transmission protocol between said system access end and said system terminal end which includes C-DOCSIS protocol, DOCSIS protocol, HiNOC protocol, HomePlugAV protocol and other open or private protocol based on the cable TV broadband network, is configurable;
wherein the access control data denotes, at initial stage of operation, various types of communication data between the system terminal end as a part of the whole network system and the system head end as well as between the system terminal end and the system access end, including data regarding whether the system terminal end is permitted to join the system, data regarding which transmission protocol is applied to the system terminal end after deployed in the system, and the communication timeslot and bandwidth allocated to the system terminal end; and the management control data means the data associated with work state and device parameters of the system terminal end between the system terminal end and the system access end or the system head end;
  said system terminal end is configured to, in an uplink direction, transmit service data, access control data and management control data to a coaxial cable media converter (CMC) device; and, in a downlink direction, receive service data, access control data and management control data;

said system access end comprises the CMC device, and said CMC device comprises:
  a radio frequency interface module, configured to, in an uplink direction, receive the service data transmitted by said system terminal end, analyze C-DOCSIS frames of said service data, implement VLAN information mapping for the frame data, insert a CDT tag to Ethernet frame headers of said service data and transmit the service data with the inserted CDT tag to a classifying-and-forwarding module, and then transmit an encapsulated C-DOCSIS management message (CDMM) to a system control module; and configured to, in a downlink direction, receive the service data transmitted by said classifying-and-forwarding module, identify the system terminal end and the service stream to which the service data belongs according to said CDT tag, and implement traffic shaping and scheduling for said service data according to the identified terminal end and service stream, and then transmit said service data to said system terminal end;

said system head end comprises:
  a configuration system, configured to provide service opening and device configuration service for said system terminal end, and implement the generating and distributing of configuration files, and software upgrade of said system terminal end;
  a network management system, configured to implement configuration, maintenance and monitoring of the network devices;
  a convergence device, comprising:
    a classifying-and-forwarding module, configured to, in an uplink direction, map the CDT tag to the service label supported by the convergence network and transmit it to the convergence network; and, in a downlink direction, implement VLAN TAG information stripping for the Ethernet frames of the service data transmitted by the convergence network, and implement data stream characteristic matching for said frames, classify the frames according to the matched data stream characteristics, insert a CDT tag to the Ethernet frame headers of the service data for identifying a particular service stream of a particular terminal end, and transmit said service data with the inserted CDT tag to the radio frequency forwarding module;
    a system control module, configured to configure and manage the radio frequency interface module and the classifying-and-forwarding module, and transmit a response frame responsive to the encapsulated C-DOCSIS management message (CDMM) transmitted by said radio frequency interface module.

9. A cable TV network broadband access system with distributed deployment and centralized control, characterized in that, comprising:
  a system terminal end, configured to receive and transmit uplink and downlink service data, and receive and respond to access control data and management control data;
  a system access end, configured to implement data format transformation and data forwarding or processing for said uplink and downlink service data, said access control data and said management control data of said system terminal end, and transmit, receive and respond to management control data of the system access end;
  a system head end, configured to implement management control and access control for said system access end and said system terminal end, and to process, converge and forward said uplink and downlink service data, wherein said system head end is capable of configuring management control functions of the system access end, and access control and management control functions of said system terminal end;
  a data transmission protocol between said system head end and said system access end which comprises IP protocol, Ethernet protocol, EPON protocol, GPON protocol, NGPON protocol, 10GEPON protocol, WDM-PON protocol and private protocol, is configurable, and the type of the data transmission protocol is adjustable; a data transmission protocol between said system access end and said system terminal end which includes C-DOCSIS protocol, DOCSIS protocol, HiNOC protocol, HomePlugAV protocol and other open or private protocol based on the cable TV broadband network, is configurable;
  wherein the access control data denotes, at initial stage of operation, various types of communication data between the system terminal end as a part of the whole network system and the system head end as well as between the system terminal end and the system access end, including data regarding whether the system terminal end is permitted to join the system, data regarding which transmission protocol is applied to the system terminal end after deployed in the system, and the communication timeslot and bandwidth allocated to the system terminal end; and the management control data means the data associated with work state and device parameters of the system terminal end between the system terminal end and the system access end or the system head end;
  said system terminal end is configured to, in an uplink direction, transmit service data, access control data and management control data to a coaxial cable media converter (CMC) device; and, in a downlink direction, receive service data, access control data and management control data;
  said system access end comprises the CMC device, and said CMC device comprising:
    a system control module, configured to configure and manage the radio frequency interface module and the classifying-and-forwarding module, and transmit a response frame responsive to an encapsulated C-DOCSIS management message (CDMM) transmitted by said radio frequency interface module;
    a classifying-and-forwarding module, configured to, in an uplink direction, map a CDT tag to the service label supported by the convergence network and transmit it to the convergence network; and configured to, in a downlink direction, implement VLAN TAG information stripping for the Ethernet frames of the service data transmitted by the convergence network, implement data stream characteristic matching for said frames, classify the frames according to the matched data stream characteristics, insert a CDT tag to Ethernet frame headers of the service data for identifying a particular service stream of a particular system terminal end, and transmit said service data with the inserted CDT tag to the radio frequency forwarding module;

a radio frequency interface module, configured to, in an uplink direction, receive said service data transmitted by said system terminal end, analyze C-DOCSIS frames of said service data, implement VLAN information mapping for the frame data, insert a CDT tag to the Ethernet frame headers of said service data and transmit the service data with the inserted CDT tag to the classifying-and-forwarding module, and then transmit the encapsulated CDMM to the system control module; and configured to, in a downlink direction, receive said service data transmitted by said classifying-and-forwarding module, identify the system terminal end and the service stream to which said service data belongs according to said CDT tag, implement traffic shaping and scheduling for said service data according to the identified terminal and service stream, and then transmit said service data to said system terminal end;

said system head end comprises:

a configuration system, configured to provide service opening and device configuration service for said system terminal end, implement the generating and distributing of configuration files, and software upgrade of said system terminal end;

a network management system, configured to implement configuration, maintenance and monitoring of network devices;

a converging-and-forwarding device, configured to complete access to a metropolitan area network.

10. The system according to claim 8 or claim 9, characterized in that:

said CDT tag includes a CoS field and a VID field, wherein said CoS field is a service stream reference identifier and said VID field is a terminal end identifier, and said CoS field in combination with said CoS field specifies a particular system terminal end and a particular service stream.

11. The system according to claim 8 or claim 9, characterized in that:

said CDMM is configured to exchange configuration, state and management information between said system control module and said radio frequency interface module, including channel and parameter configuration, state and statistic of transmission and reception, load balancing, cable modem state, cable modem registration information, dynamic service stream operation, multicast and security information.

12. The system according to claim 8 or claim 9, characterized in that:

in said radio frequency interface module, if the length of CDMM is longer than the maximum transmission length of the transmission layer, the frame fragmentation is executed to said CDMM, and each fragment being one protocol data unit (PDU) of said CDMM; and, said CDMM comprises a first PDU and subsequent PUDs, and CDMMs after the frame fragmentation are encapsulated.

13. The system according to claim 8 or claim 9, characterized in that said radio frequency interface module defines the interface specifications of the MAC layer and the PHY layer between said system access end and said system terminal end.

14. The system according to claim 8 or claim 9, characterized in that said radio frequency interface module of said system access end defines the interface specification of the PHY layer between said system access end and said system terminal end; and the classifying-and-forwarding module of said system head end defines the interface specification of the MAC layer between said system access end and said system terminal end.

15. The system according to claim 8 or claim 9, characterized in that said system head end communicates with said convergence network via a network side interface, and said network side interface defines the physical interface and the service stream mapping logic between said system head end and the convergence network.

16. The system according to claim 8 or claim 9, characterized in that said system head end communicates with said network management system and said configuration system via an operation management interface.

17. The system according to claim 8 or claim 9, characterized in that said system control module communicates with said classifying-and-forwarding module via a control and classifying-and-forwarding interface.

18. The system according to claim 8 or claim 9, characterized in that said configuration system comprises a DHCP server, a configuration file server, a software download server, a clock agreement server and a policy server.

19. The system according to claim 8 or claim 9, characterized in that said network management system comprises a SNMP management system and a Syslog server.

20. The system according to claim 9, characterized in that said converging-and-forwarding device includes an OLT, an Ethernet switcher or a router.

21. The system according to claim 9, characterized in that said system terminal end is a cable modem.

* * * * *